US008683089B1

(12) United States Patent
Wong et al.

(10) Patent No.: US 8,683,089 B1
(45) Date of Patent: Mar. 25, 2014

(54) METHOD AND APPARATUS FOR EQUALIZING A BANDWIDTH IMPEDANCE MISMATCH BETWEEN A CLIENT AND AN INTERFACE

(75) Inventors: Raymond Hoi Man Wong, Richmond Hill (CA); Samuel H. Duncan, Arlington, MA (US); Lukito Muliadi, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 359 days.

(21) Appl. No.: 12/650,371

(22) Filed: Dec. 30, 2009

Related U.S. Application Data

(60) Provisional application No. 61/245,202, filed on Sep. 23, 2009.

(51) Int. Cl.
G06F 3/00 (2006.01)
G06F 13/00 (2006.01)
(52) U.S. Cl.
USPC .......... 710/15; 710/4; 710/5; 710/17; 710/18; 710/19; 710/20; 710/29; 710/33; 710/36
(58) Field of Classification Search
USPC .......... 710/4, 5, 15, 17, 18, 19, 20, 29, 33, 36
See application file for complete search history.

(56) References Cited

U.S. PATENT DOCUMENTS

| 5,255,241 | A  | * | 10/1993 | Stern et al. ............... 365/226 |
| 7,370,161 | B2 | * | 5/2008  | Kim et al. ................. 711/158 |
| 7,523,230 | B1 | * | 4/2009  | Dodd et al. ................. 710/35 |
| 7,596,707 | B1 | * | 9/2009  | Vemula ................... 713/320 |
| 2004/0093442 | A1 | * | 5/2004 | Furuya ................... 710/52 |
| 2005/0289292 | A1 | * | 12/2005 | Morrow et al. ............. 711/105 |
| 2008/0235484 | A1 | * | 9/2008 | Tal et al. ................. 711/201 |

FOREIGN PATENT DOCUMENTS

| WO | 2008127610 | 10/2008 |
| WO | 2008127622 | 10/2008 |
| WO | 2008127623 | 10/2008 |

* cited by examiner

Primary Examiner — Scott Sun
(74) Attorney, Agent, or Firm — Patterson + Sheridan, L.L.P.

(57) ABSTRACT

One or more client engines issues write transactions to system memory or peer parallel processor (PP) memory across a peripheral component interconnect express (PCIe) interface. The client engines may issue write transactions faster than the PCIe interface can transport those transactions, causing write transactions to accumulate within the PCIe interface. To prevent the accumulation of write transactions within the PCIe interface, an arbiter throttles write transactions received from the client engines based on the number of write transactions currently being transported across the PCIe interface.

23 Claims, 7 Drawing Sheets

METHOD AND APPARATUS FOR EQUALIZING A BANDWIDTH IMPEDANCE MISMATCH BETWEEN A CLIENT AND AN INTERFACE

CROSS-REFERENCE TO RELATED APPLICATIONS

This application claims the priority benefit of Provisional U.S. Patent Application Ser. No. 61/245,202, filed Sep. 23, 2009, the subject matter of which is hereby incorporated by reference.

BACKGROUND OF THE INVENTION

1. Field of the Invention

Embodiments of the present invention relate generally to parallel processing, and, more specifically, to a method and apparatus for equalizing a bandwidth impedance mismatch between a client and an interface.

2. Description of the Related Art

A modern computer system may be implemented with a processor that executes many operations in parallel known as a parallel processing unit (PPU). PPUs generally include one or more engines (or clients), that perform operations such as memory management, graphics display, instruction fetching, encryption, and other operations.

Clients often write data to and/or read data from system memory, peer parallel processor (PP) memory (memory associated with peer PPUs) and/or local PP memory. In doing so, clients issue write and/or read transactions that target system memory, peer PP memory, and/or local PP memory via a crossbar (x-bar). The x-bar is coupled to system memory and peer PP memory via a system interface and to local PP memory via a local interface. The system interface transports transactions at a certain rate, referred to as the "system transaction rate," while the local interface transports transactions at another rate, referred to as the "local transaction rate." Typically, the system transaction rate is much lower than the local transaction rate.

Some clients may issue write transactions to system memory and/or peer memory at a rate that is much higher than the system transaction rate. When such a client issues excessive write transactions, the write transactions can accumulate within the system interface and then spill into the x-bar. A consequence of this situation is that the rate at which the x-bar can transport transactions is reduced to the system transaction rate. The x-bar can then only transport transactions that target local PP memory at the system transaction rate. Since the system transaction rate is much lower than the local transaction rate, as described, the accumulated transactions within the x-bar effectively reduce the local transaction rate to be equal to the system transaction rate. This situation causes problems for certain clients.

Specifically, some clients require transactions to be transported to local PP memory at the local transaction rate. When the local transaction rate is reduced to the system transaction rate, those clients may be stalled and the throughput of the PPU may be reduced.

Accordingly, what is needed is a technique to avoid the accumulation of write transactions within the system interface when clients issue write transactions at a rate that exceeds the system transaction rate.

SUMMARY OF THE INVENTION

Embodiments of the invention include a method for managing write transactions issued by a plurality of clients, where a first set of clients issues a first set of write transactions to a first memory aperture across a first interface or to a second memory aperture across a second interface through a common virtual channel. The method includes the steps of computing a first threshold counter value based on the size of the write transactions in the first set of write transactions, the number of write transactions currently being transmitted across the first interface, and a maximum bandwidth value associated with the first interface, receiving a first write transaction associated with the first set of write transactions that targets the first memory aperture, incrementing a first counter value associated with the first set of clients by a first increment value in response to receiving the first write transaction, and throttling the first write transaction when the first counter value exceeds the first threshold counter value.

One advantage of the method is that write requests are prevented from accumulating within the first interface, thereby preserving the rate at which write transactions can be transmitted across the second interface to the second memory aperture.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
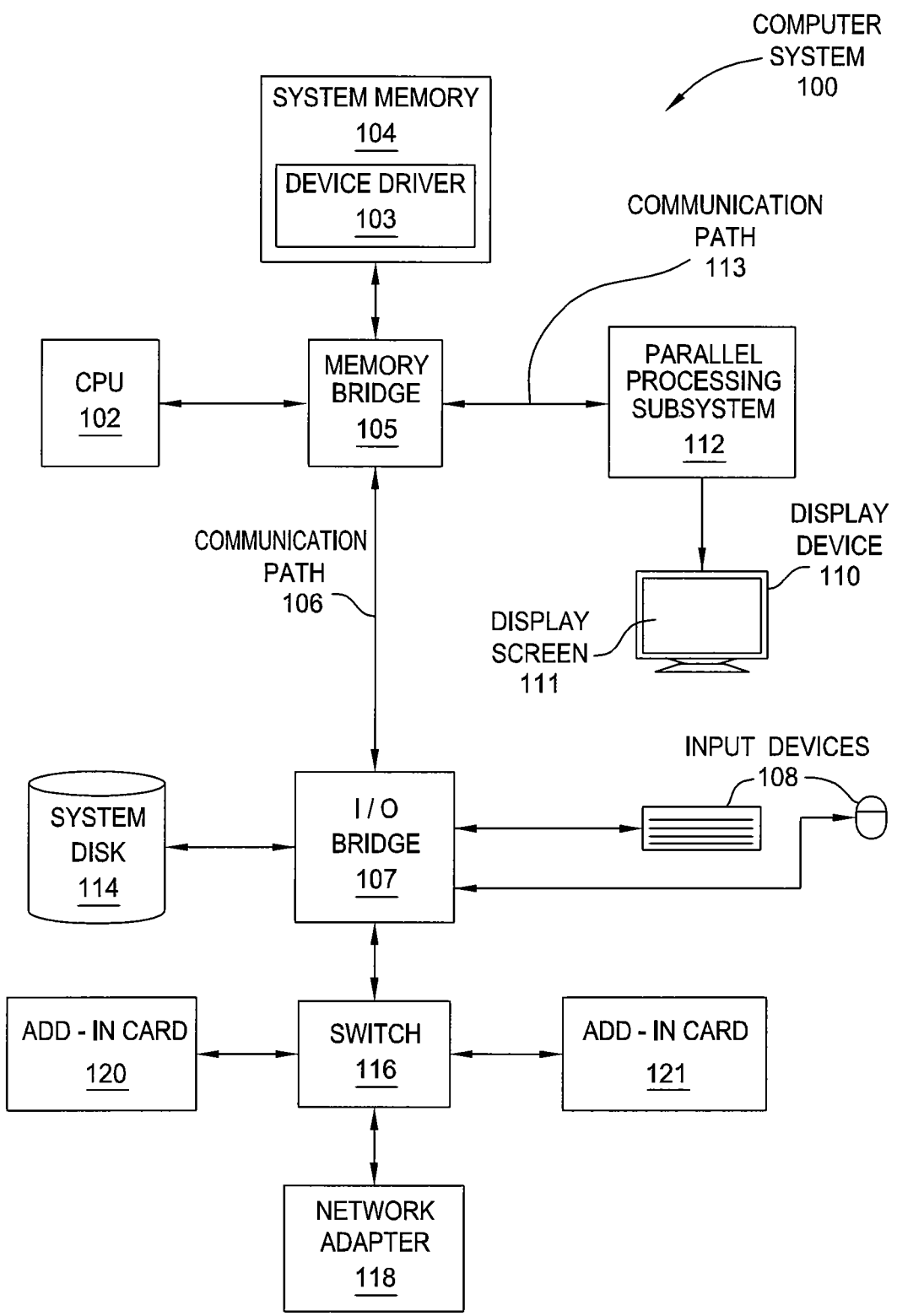
FIG. 1 is a block diagram illustrating a computer system configured to implement one or more aspects of the invention.

FIG. 1 is a block diagram illustrating a computer system 100 configured to implement one or more aspects of the invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
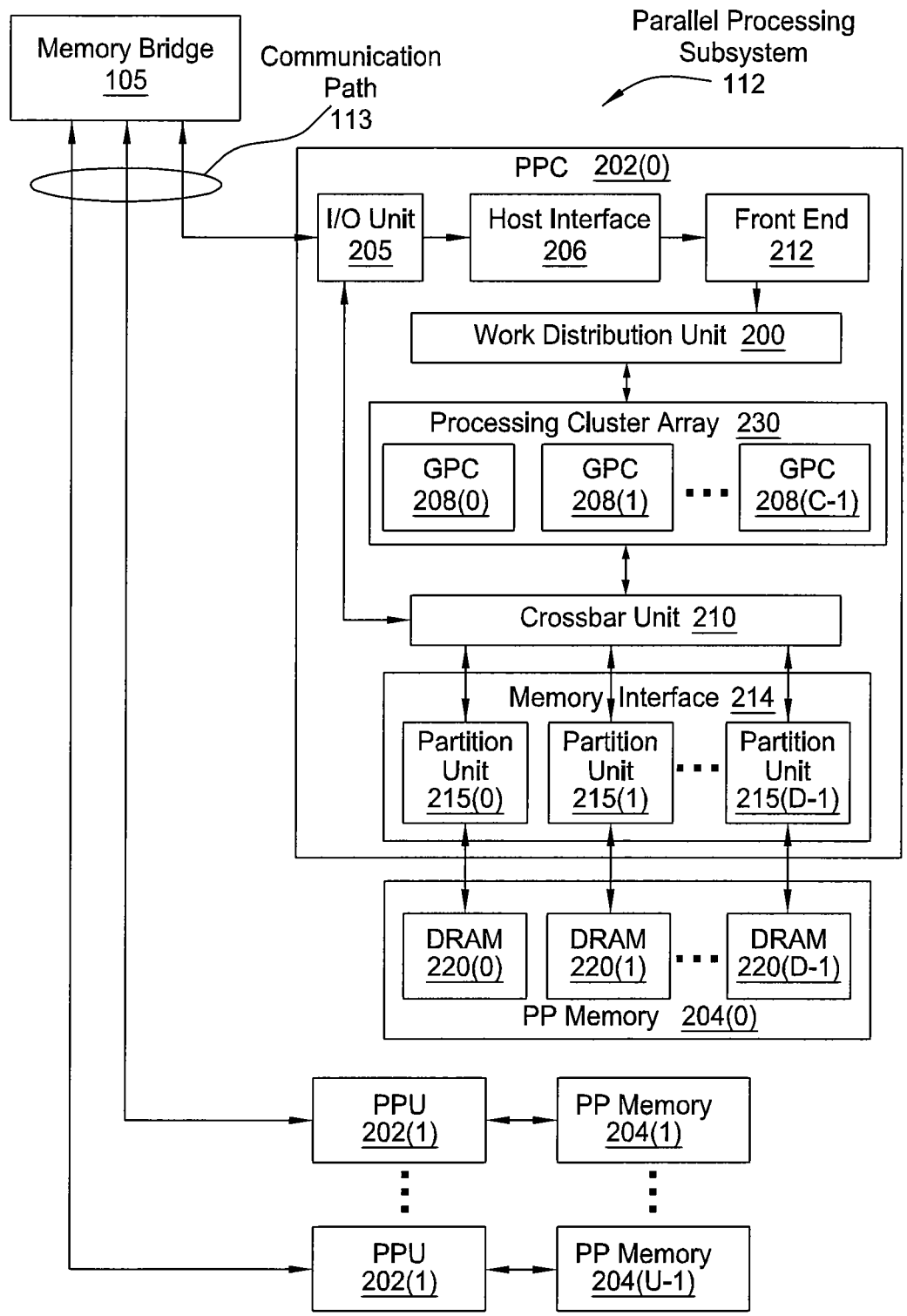
FIG. 2 is a block diagram of a parallel processing subsystem for the computer system of FIG. 1, according to one embodiment of the invention.

FIG. 2 illustrates a parallel processing subsystem 112, according to one embodiment of the invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g. DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
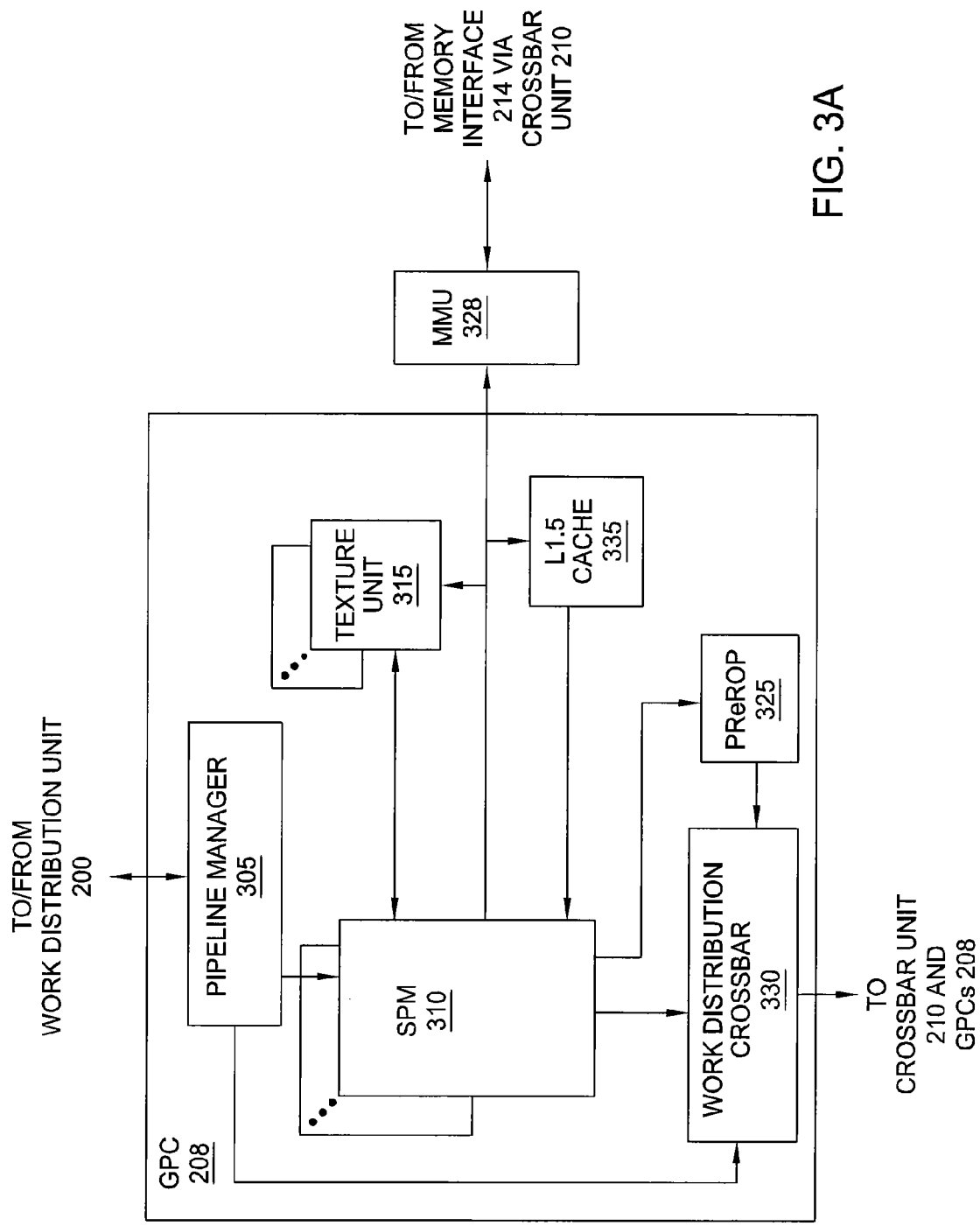
FIG. 3A is a block diagram of a GPC within one of the PPUs of FIG. 2, according to one embodiment of the invention.

FIG. 3A is a block diagram of a GPC 208 within one of the PPUs 202 of FIG. 2, according to one embodiment of the invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
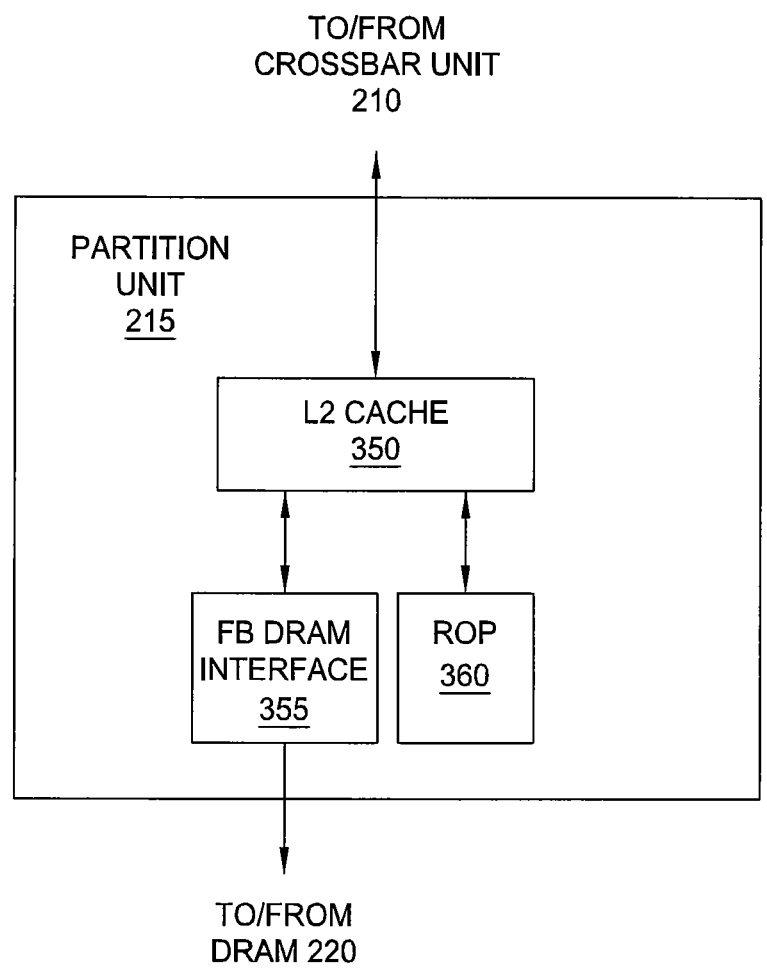
FIG. 3B is a block diagram of a partition unit within one of the PPUs of FIG. 2, according to one embodiment of the invention.

FIG. 3B is a block diagram of a partition unit 215 within one of the PPUs 202 of FIG. 2, according to one embodiment of the invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
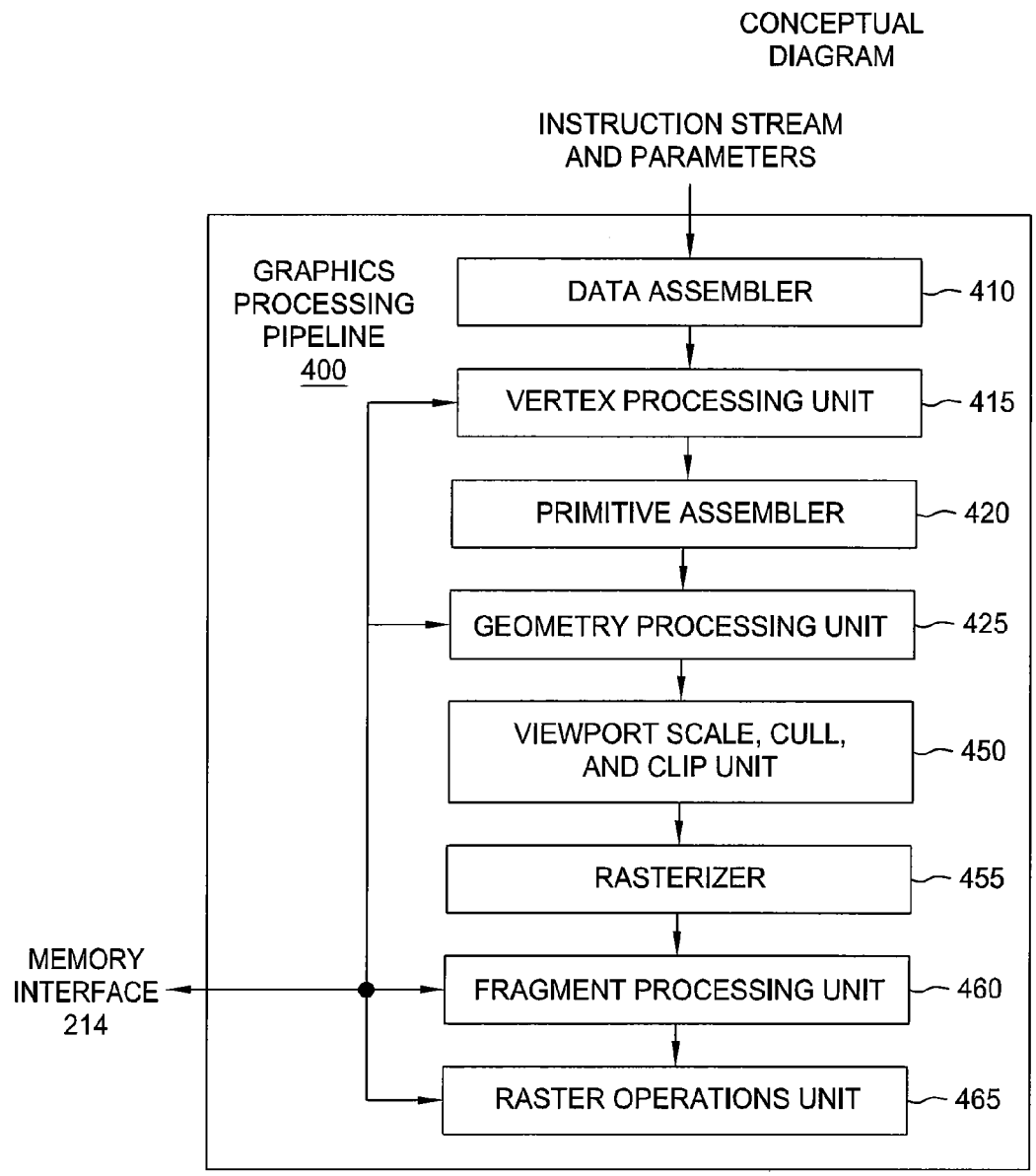
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Equalizing a Bandwidth Impedance Mismatch

Figure 5:
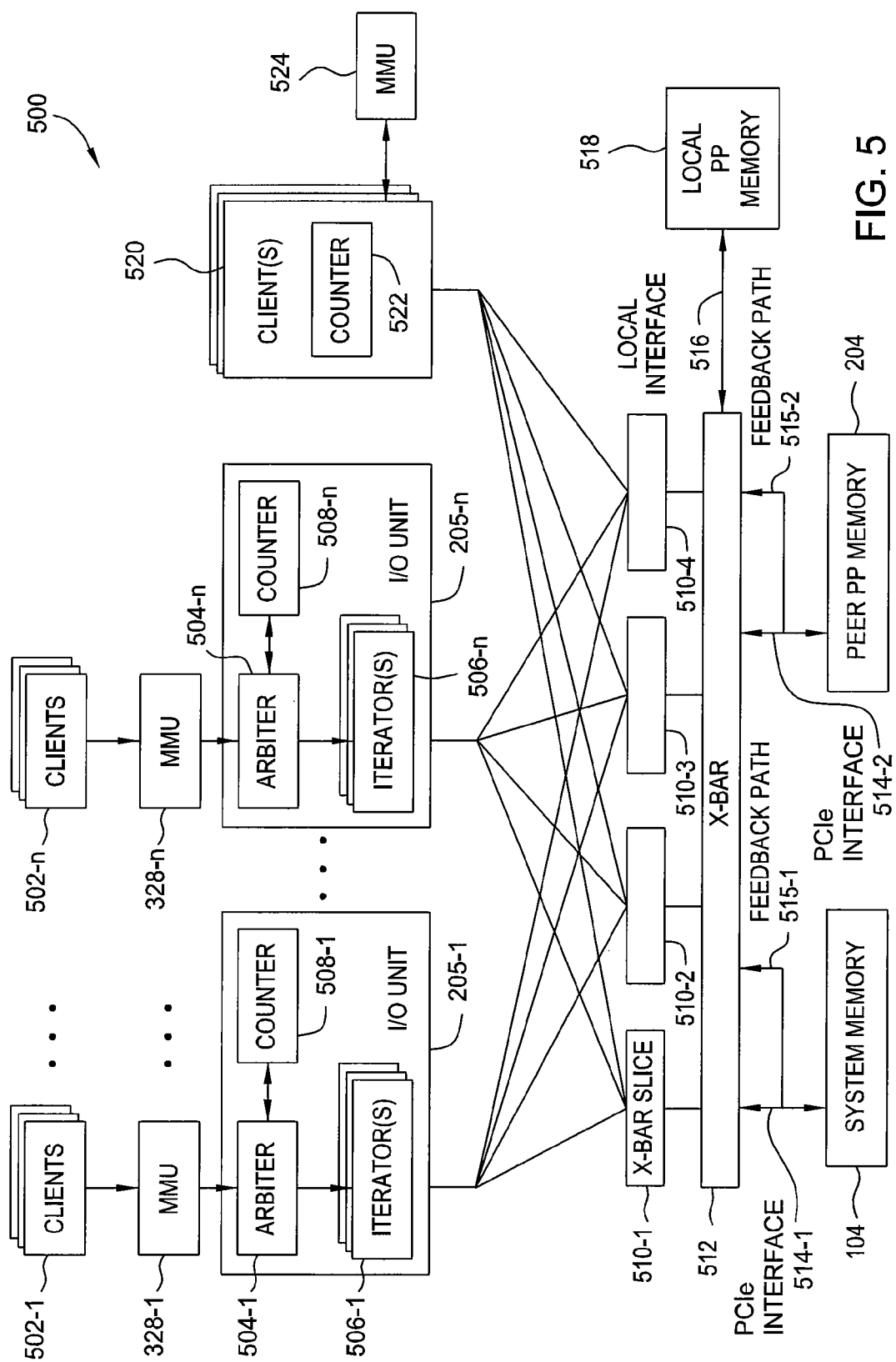
FIG. 5 is a system for handling transactions issued by one or more clients, according to one embodiment of the invention.

FIG. 5 illustrates a system 500 for handling transactions issued by one or more clients 502-1 through 502-n and 520, according to one embodiment of the invention. System 500 comprises a portion of the parallel processing subsystem 112. As shown, system 500 includes memory management units (MMUs) 328-1 through 328-n, I/O units 205-1 through 205-n, crossbar (x-bar) slices 510-1 through 510-4, x-bar 512, peripheral component interconnect express (PCIe) interface 514, feedback path 515, system memory 104, peer parallel processor (PP) memory 204, local interface 516, and local PP memory 518.

Clients 502-1 through 502-n include host interface 206, front end 212, and engines that perform operations such as memory management, graphics display, instruction fetching, encryption, and other operations. Although system 500 includes multiple instances of certain components (e.g., clients 502-1 through 502-n, MMU 328-1 through 328-n, and so forth), the following description is directed towards generic instances of these components (e.g., clients 502, MMU 328, and so forth). Accordingly, the functionality described with reference to a particular generic component (MMU 328, etc.) is equally applicable to the specific instances of that component (MMU 328-1 and MMU 328-n).

Clients 502 issue read transactions and write transactions (e.g., "transactions") that target system memory 104, peer PP memory 204, and local PP memory 518. MMU 328 receives these transactions and performs a virtual-to-physical address mapping. MMU 328 then transmits the physical address to an arbiter 504 within I/O unit 205. Arbiter 504 is coupled to one or more iterators 506 and to a counter 508. Arbiter 504 may throttle write requests that target system memory 104 or peer PP memory 204 under certain circumstances, as described in greater detail below.

Iterator 506 is configured to receive transactions from arbiter 504 and then transmit those transactions to system memory 104, peer PP memory 204, and local memory 516 via different x-bar slices 510 associated with x-bar 512. Each x-bar slice 510 corresponds to a different region of system memory 104, peer PP memory 204, or local PP memory 516. X-bar 512 is coupled to system memory 104 and peer PP memory 204 via PCIe interface 514. PCIe interface 514 is configured to transport transactions at a particular rate, referred to herein as the "PCIe transaction rate." PCIe interface 514 is coupled to x-bar 512 via a feedback path 515. Feedback path 515 transmits a feedback signal that reflects the number of write transactions being transported along PCIe interface 514. The feedback signal transmitted across feedback path 515 may thus indicate the amount of available bandwidth on the PCIe interface 514.

X-bar 512 is also coupled to local PP memory 518 via a local interface 516. Local interface 516 is configured to transport transactions at a "local transaction rate" that is greater than the PCIe transaction rate. Local interface 516 and PCIe interface 514 both occupy the same virtual channel within x-bar 512.

Some clients 502 issue write transactions at a rate that exceeds the PCIe transaction rate. When such a client issues a particular number of write transactions, those transactions may accumulate within the PCIe interface 514 and then spill into x-bar 512. Since local interface 516 and PCIe interface 514 occupy the same virtual channel, that virtual channel may become "filled" with write transactions that have accumulated within the PCIe interface 514. The virtual channel can then only be drained at the PCIe transaction rate, thereby reducing the local transaction rate to be equal to the PCIe transaction rate.

Certain clients 502 require transactions issued to local PP memory 518 to be transported at the local transaction rate. These clients may become stalled when accumulated write transactions decrease the local transaction rate. In order to avoid this situation, arbiter 504 limits the rate at which write transactions are transmitted across PCIe interface 514 to be equal to the PCIe transaction rate. When a write transaction is transmitted across PCIe interface 514, arbiter 504 increments counter 508 by a value that is equal to the size of the write transaction. In one embodiment, that size is 16 bytes. When counter 508 exceeds a threshold value, arbiter 504 throttles write transactions that target either system memory 104 or peer PP memory 204.

The threshold value is determined based on the feedback signal received from PCIe interface 514 via feedback path 515, the maximum bandwidth of PCIe interface 514, and the size of each write transaction. Since the feedback signal reflects the total number of write transactions transmitted across PCIe interface 515, the feedback signal provides an indication of the amount of bandwidth available on the PCIe interface 515. In one embodiment, arbiter 504 calculates the threshold value for counter 508. In another embodiment, iterator 506 calculates the threshold value for counter 508.

Each I/O unit 205-1 through 205-n includes a different counter 508 (e.g., counters 508-1 through 508-n) that receives the same feedback signal via feedback path 515. An arbiter 504 within a particular I/O unit 205 may thus throttle write transactions received from clients 502 with which that I/O unit 205 is associated based on the total available bandwidth of the PCIe interface 514 (i.e., based on the total number of write transactions transmitted by all of the I/O units 205).

At each clock cycle, arbiter 504 decrements the counter 508 by one value. When the counter 508 is less than the threshold value, arbiter 504 allows additional write transactions to be transmitted across PCIe interface 514. Through this technique, write transactions cannot be transmitted across PCIe interface 514 faster than those transactions can be drained by PCIe interface 514, and, thus, write transactions do not accumulate within PCIe interface 514 and spill into x-bar 512. The local transaction rate is preserved, and clients 502 that require the local transaction rate are not stalled.

In one embodiment, counter 508 stores a value that represents an amount of "bandwidth credit" associated with PCIe interface 514 that each I/O unit 205 may consume by issuing write transactions. When a write transaction is issued, counter 508 is decremented, thereby reflecting that a particular amount of bandwidth credit has been consumed. When the counter reaches zero, arbiter 506 does not allow additional write transactions. At each clock cycle, the counter is incremented. Arbiter 504 allows write transactions to be issued across PCIe interface 514 at a rate that is proportional to the amount of available bandwidth credit. Accordingly, the higher the value of counter 508, the higher the number of write transactions that can be issued.

In various embodiments, one or more clients 520 are directly coupled to x-bar 512 via x-bar slices 510 and may issue read and/or write transactions to system memory 104, peer PP memory 204, and/or local PP memory 518 without first transmitting these transactions to an arbiter. As shown, clients 520 are coupled to an MMU 524 that is configured to perform virtual-to-physical address mappings. As with clients 502, certain clients 520 may transmit write transactions at a rate that exceeds the PCIe transaction rate, thus resulting in accumulated write transactions within PCIe interface 514 in the manner described above.

To prevent this situation, each client 520 includes a counter 522 that is substantially similar to counter 508. A given client 520 increments and decrements a different counter 522 based on the same technique as that implemented by arbiter 504. Client 520 receives the feedback signal via the feedback path 515 and calculates a threshold value for counter 522 based on the feedback signal, the maximum bandwidth of PCIe interface 514, and the size of each write transaction issued by client 520 to system memory 104 and/or peer memory 204. Like arbiter 504, client 520 determines whether additional write transactions can be issued across PCIe interface 514 based on comparing the value of counter 522 to the calculated threshold value. In general, each client 520 includes the functionality of arbiter 504, iterator 506, and counter 522.

By implementing the various functionalities described herein, system 500 prevents certain clients from issuing write transactions faster than those transactions can be transported. As a result, system 500 prevents excess transactions from accumulating within PCIe interface 514 and spilling into x-bar 512, thereby maintaining a high local transaction rate compared to the PCIe transaction rate.

Figure 6:
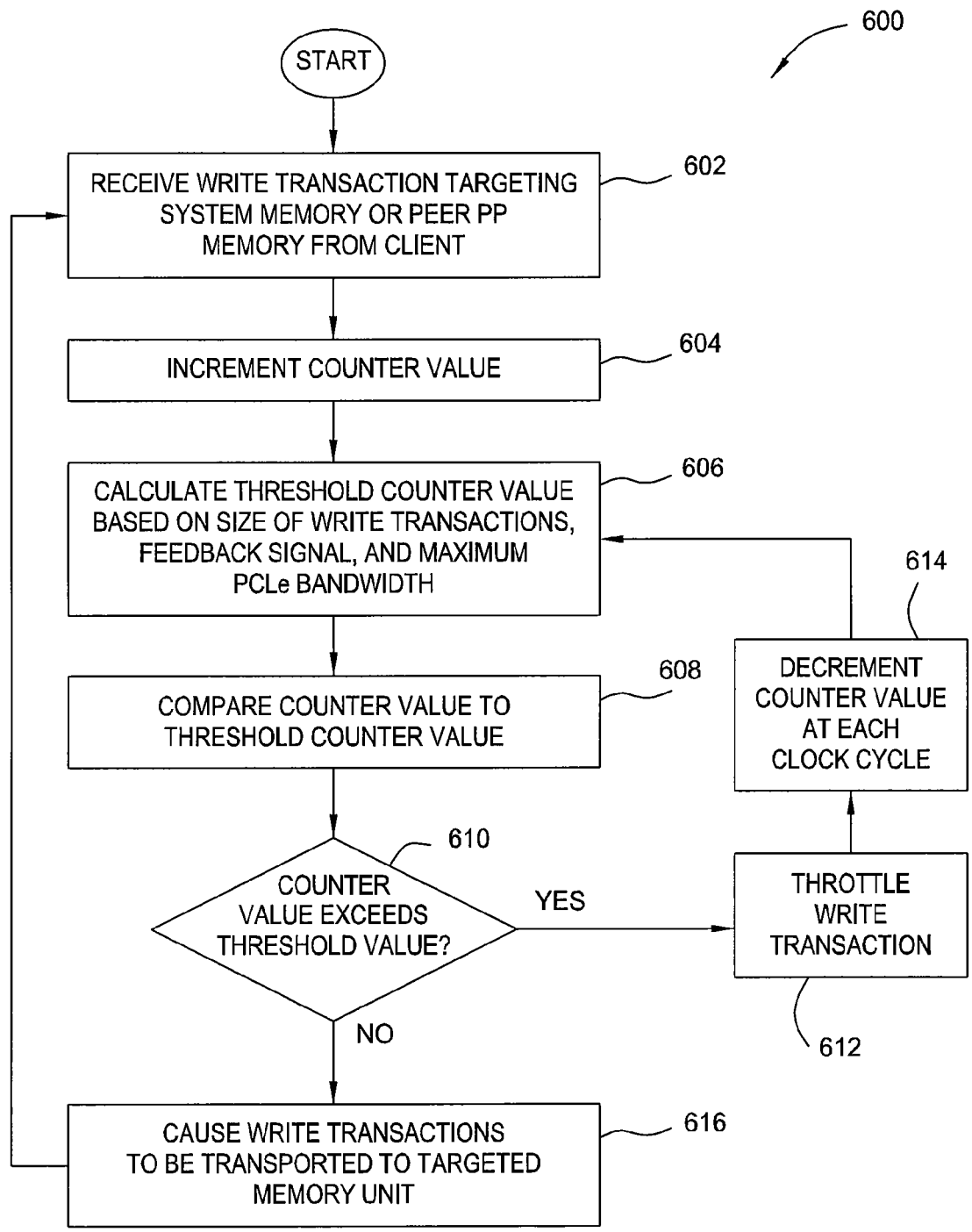
FIG. 6 is a flowchart of method steps for throttling write transactions issued by one or more clients, according to one embodiment of the invention.

FIG. 6 is a flowchart of method steps for throttling write transactions issued by one or more clients, according to one embodiment of the invention. Although the method steps are described in conjunction with the systems of FIGS. 1-5, persons skilled in the art will understand that any system configured to perform the method steps, in any order, is within the scope of the invention.

As shown, the method 600 begins at step 602, where arbiter 504 receives a write transaction targeting either system memory 104 or peer PP memory 204 from one of clients 502. Clients 502 may include engines that perform operations such as memory management, graphics display, instruction fetching, encryption, and other operations. Each client 502 may issue read and/or write transactions to system memory 104 and/or peer PP memory 204 that are transported across PCIe interface 514. Each client 502 may also issue read and/or write transactions to local PP memory 518 that are transported across local interface 516.

At step 604, arbiter 504 increments a counter value associated with counter 508. The counter value reflects a total number of write transactions issued by clients 502. At each clock cycle, arbiter 504 also decrements the counter value by one value. The method 600 may be implemented once for each clock cycle, or, alternatively, once for more than one clock cycle. At step 606, arbiter 504 calculates a threshold counter value for counter 508 based on the size of the write transactions that are issued by clients 502, a feedback signal transmitted across feedback path 515, and a maximum bandwidth associated with PCIe interface 514. In one embodiment, arbiter 504 performs step 606 prior to performing step 604.

At step 608, arbiter 504 compares the counter value to the threshold counter value calculated at step 606. At step 610, arbiter 504 determines whether the counter value exceeds the threshold counter value. If arbiter 504 determines that the counter value exceeds the threshold counter value, then the method 600 proceeds to step 612.

At step 612, arbiter 504 throttles the write transaction issued by client 502. Arbiter 504 may throttle the write transaction for any amount of time. The method 600 then returns to step 606 and proceeds as described above. Since other clients 502 associated with other I/O units 205 may issue write transactions targeting system memory 104 or peer PP memory 204, thereby consuming the bandwidth of PCIe interface 514, arbiter 504 recalculates the threshold counter value at step 606 to reflect the amount of PCIe bandwidth currently available.

At step 610, if arbiter 504 determines that the counter value does not exceed the threshold counter value, then the method 600 proceeds to step 614. At step 614, arbiter 504 causes the write transaction issued by client 502 to be transported to the targeted memory unit (either system memory 104 or peer PP memory 204). The method 600 then ends.

By implementing the method 600, as described above, the system 500 avoids situations where the local transaction rate is reduced to equal the PCIe transaction rate. In one embodiment, the steps of the method 600 are implemented by clients 520.

In sum, an arbiter within a parallel processing unit receives read and/or write transactions from one or more client engines (clients) faster than those transactions can be transported to a targeted memory unit across a peripheral component interconnect express (PCIe) interface. In order to prevent write transactions from accumulating within the PCIe interface, the arbiter maintains a counter that stores a value indicative of an amount of PCIe interface bandwidth consumed by previously-issued write transactions. The arbiter calculates a threshold value for the counter based on the total number of write transactions currently being transported across the PCIe interface. When the value stored by the counter exceeds the calculated threshold value, the arbiter throttles additional write transactions received from the clients. In this manner, the arbiter equalizes a mismatch between the rate at which clients issue write transactions and the rate at which those transactions can be transported to targeted memory units.

Advantageously, the arbiter prevents write requests from accumulating within the PCIe interface and spilling into the x-bar, thereby preserving the rate at which write transactions can be transported across a local interface to a local memory unit.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer, such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed:

1. A method for managing write transactions issued by a plurality of clients, wherein a first set of clients issues a first set of write transactions to a first memory aperture across a first interface or to a second memory aperture across a second interface through a common virtual channel, the method comprising:

computing a first threshold counter value based on the size of the write transactions in the first set of write transactions, a feedback signal from the first interface, wherein the feedback signal is indicative of the number of write transactions currently being transmitted across the first interface, and a maximum bandwidth value associated with the first interface;

receiving a first write transaction associated with the first set of write transactions that targets the first memory aperture;

incrementing a first counter value associated with the first set of clients by a first increment value in response to receiving the first write transaction; and throttling the first write transaction when the first counter value exceeds the first threshold counter value.

2. The method of claim 1, further comprising the step of decrementing the first counter value at each clock cycle.

3. The method of claim 1, wherein the first memory aperture includes a system memory unit and one or more peer parallel processor memory units, and the second memory aperture includes a local parallel processor memory unit.

4. The method of claim 1, wherein the first interface comprises a peripheral component interconnect express (PCIe) interface, and the second interface comprises a local memory interface.

5. The method of claim 1, wherein the first increment value is equal to the size of the write transactions in the first set of write transactions.

6. The method of claim 5, wherein the size of the write transactions in the first set of write transactions is 16 bytes.

7. The method of claim 1, wherein a second set of clients issues a second set of write transactions to the first memory aperture across the first interface or to the second memory aperture across the second interface through the common virtual channel, the method further comprising:
computing a second threshold counter value based on the size of the write transactions in the second set of write transactions, the number of write transactions currently being transmitted across the first interface, and a maximum bandwidth value associated with the first interface;
receiving a second write transaction associated with the second set of write transactions that targets the first memory aperture;
incrementing a second counter value associated with the second set of clients by a second increment value in response to receiving the second write transaction;
throttling the second write transaction when the second counter value exceeds the second threshold counter value; and
decrementing the second counter value at each clock cycle.

8. A non-transitory computer-readable storage medium storing program instructions that, when executed by a processor, manages write transactions issued by a plurality of clients, wherein a first set of clients issues a first set of write transactions to a first memory aperture across a first interface or to a second memory aperture across a second interface through a common virtual channel, by performing the steps of:
computing a first threshold counter value based on the size of the write transactions in the first set of write transactions, a feedback signal from the first interface, wherein the feedback signal is indicative of the number of write transactions currently being transmitted across the first interface, and a maximum bandwidth value associated with the first interface;
receiving a first write transaction associated with the first set of write transactions that targets the first memory aperture;
incrementing a first counter value associated with the first set of clients by a first increment value in response to receiving the first write transaction; and
throttling the first write transaction when the first counter value exceeds the first threshold counter value.

9. The computer-readable storage medium of claim 8, further comprising the step of decrementing the first counter value at each clock cycle.

10. The computer-readable storage medium of claim 8, wherein the first memory aperture includes a system memory unit and one or more peer parallel processor memory units, and the second memory aperture includes a local parallel processor memory unit.

11. The computer-readable storage medium of claim 8, wherein the first interface comprises a peripheral component interconnect express (PCIe) interface, and the second interface comprises a local memory interface.

12. The computer-readable storage medium of claim 8, wherein the first increment value is equal to the size of the write transactions in the first set of write transactions.

13. The computer-readable storage medium of claim 12, wherein the size of the write transactions in the first set of write transactions is 16 bytes.

14. The computer-readable storage medium of claim 8, wherein a second set of clients issues a second set of write transactions to the first memory aperture across the first interface or to the second memory aperture across the second interface through the common virtual channel, and further comprising the steps of:
computing a second threshold counter value based on the size of the write transactions in the second set of write transactions, the number of write transactions currently being transmitted across the first interface, and a maximum bandwidth value associated with the first interface;
receiving a second write transaction associated with the second set of write transactions that targets the first memory aperture;
incrementing a second counter value associated with the second set of clients by a second increment value in response to receiving the second write transaction;
throttling the second write transaction when the second counter value exceeds the second threshold counter value; and
decrementing the second counter value at each clock cycle.

15. A system for managing write transactions issued by a plurality of clients, wherein a first set of clients issues a first set of write transactions to a first memory aperture across a first interface or to a second memory aperture across a second interface through a common virtual channel, the system comprising:
a processor configured to:
compute a first threshold counter value based on the size of the write transactions in the first set of write transactions and a feedback signal from the first interface, wherein the feedback signal is indicative of the number of write transactions currently being transmitted across the first interface, and a maximum bandwidth value associated with the first interface;
receive a first write transaction associated with the first set of write transactions that targets the first memory aperture;
increment a first counter value associated with the first set of clients by a first increment value in response to receiving the first write transaction; and
throttle the first write transaction when the first counter value exceeds the first threshold counter value.

16. The system of claim 15, further comprising a memory storing program instructions that, when executed by the processor, configure the processor to:
compute the first threshold counter value;
receive the first write transaction;
increment the first counter value; and
throttle the first write transaction.

17. The system of claim 15, wherein the processor is further configured to decrement the first counter value at each clock cycle.

18. The system of claim 15, wherein the first memory aperture includes a system memory unit and one or more peer parallel processor memory units, and the second memory aperture includes a local parallel processor memory unit.

19. The system of claim 15, wherein the first interface comprises a peripheral component interconnect express (PCIe) interface, and the second interface comprises a local memory interface.

20. The system of claim 15, wherein the first increment value is equal to the size of the write transactions in the first set of write transactions.

21. The system of claim 20, wherein the size of the write transactions in the first set of write transactions is 16 bytes.

22. The system of claim 15, wherein a second set of clients issues a second set of write transactions to the first memory aperture across the first interface or to the second memory aperture across the second interface through the common virtual channel, and the processor is further configured to:
compute a second threshold counter value based on the size of the write transactions in the second set of write transactions, the number of write transactions currently being transmitted across the first interface, and a maximum bandwidth value associated with the first interface;
receive a second write transaction associated with the second set of write transactions that targets the first memory aperture;
increment a second counter value associated with the second set of clients by a second increment value in response to receiving the second write transaction;
throttle the second write transaction when the second counter value exceeds the second threshold counter value; and
decrement the second counter value at each clock cycle.

23. The system of claim 22, further comprising a memory storing instructions that, when executed by the processor, configure the processor to:
compute the second threshold counter value;
receive the second write transaction;
increment the second counter value; and
throttle the second write transaction.

* * * * *

UNITED STATES PATENT AND TRADEMARK OFFICE
CERTIFICATE OF CORRECTION

| | | |
|---|---|---|
| PATENT NO. | : 8,683,089 B1 | Page 1 of 1 |
| APPLICATION NO. | : 12/650371 | |
| DATED | : March 25, 2014 | |
| INVENTOR(S) | : Wong et al. | |

It is certified that error appears in the above-identified patent and that said Letters Patent is hereby corrected as shown below:

Claims:

Column 16, Claim 15, Lines 44-45, delete "transactions and" and insert --transactions,-- therefor.

Signed and Sealed this
First Day of July, 2014

Michelle K. Lee
*Deputy Director of the United States Patent and Trademark Office*